United States Patent
Holt et al.

(10) Patent No.: US 12,227,312 B2
(45) Date of Patent: Feb. 18, 2025

(54) SYSTEM AND METHOD FOR THERMAL CONTROL OF POWERED SYSTEMS ON-BOARD A FLIGHT VEHICLE USING PHASE CHANGE MATERIALS (PCMS)

(71) Applicant: Raytheon Company, Arlington, VA (US)

(72) Inventors: Brendon R. Holt, Tucson, AZ (US); Gerald P. Uyeno, Tucson, AZ (US); Vanessa Reyna, Tucson, AZ (US); Olga Vargas, Tucson, AZ (US); Jordan Sawyer, Marana, AZ (US); Brayden Peery, Vail, AZ (US)

(73) Assignee: Raytheon Company, Arlington, VA (US)

( * ) Notice: Subject to any disclaimer, the term of this patent is extended or adjusted under 35 U.S.C. 154(b) by 484 days.

(21) Appl. No.: 17/478,440

(22) Filed: Sep. 17, 2021

(65) Prior Publication Data

US 2023/0087209 A1    Mar. 23, 2023

(51) Int. Cl.
*B64G 1/58* (2006.01)
*B64G 1/00* (2006.01)
*B64G 1/50* (2006.01)

(52) U.S. Cl.
CPC ............... *B64G 1/50* (2013.01); *B64G 1/002* (2013.01); *B64G 1/58* (2013.01)

(58) Field of Classification Search
CPC .......... B64G 1/002; B64G 1/50; B64G 1/503; B64G 1/58; B64U 20/90; B64U 20/92; B64D 2013/0614; F28F 20/02; F28F 20/021; F28F 20/023; F28F 20/026; F28F 20/028; F28F 2021/0021
See application file for complete search history.

(56) References Cited

U.S. PATENT DOCUMENTS

| | | | | |
|---|---|---|---|---|
| 5,669,584 | A * | 9/1997 | Hickey | B64G 1/50 244/171.7 |
| 6,939,610 | B1 * | 9/2005 | Kaul | B64G 1/58 428/407 |
| 8,342,454 | B1 * | 1/2013 | Leimkuehler | B64G 1/50 244/159.1 |
| 9,395,123 | B1 * | 7/2016 | Leimkuehler | F28D 15/00 |

(Continued)

FOREIGN PATENT DOCUMENTS

| | | | | |
|---|---|---|---|---|
| EP | 3760689 A1 * | 1/2021 | | B01J 13/04 |
| GB | 2504250 A * | 1/2014 | | F25B 9/02 |
| WO | WO-2019243572 A1 * | 12/2019 | | B64D 13/06 |

OTHER PUBLICATIONS

Meseguer, J., Pérez-Grande, I., Sanz-Andrés, A., & Alonso, G. (2014). Thermal Systems. The International Handbook of Space Technology, 371-395. (Year: 2014).*

(Continued)

*Primary Examiner* — Christopher D Hutchens
*Assistant Examiner* — Michael A. Fabula
(74) *Attorney, Agent, or Firm* — Schwegman Lundberg & Woessner, P.A.

(57) ABSTRACT

Thermal control of powered systems on-board a flight vehicle is achieved by leveraging the latent heat storage capacity of Phase Change Materials (PCMs) to maintain the operating temperature at or slightly above the melting temperature of the PCM.

15 Claims, 9 Drawing Sheets

(56) References Cited

U.S. PATENT DOCUMENTS

| | | | | |
|---|---|---|---|---|
| 2003/0010041 | A1* | 1/2003 | Wessling | B64G 1/50 |
| | | | | 62/457.2 |
| 2015/0237762 | A1* | 8/2015 | Holt | H01L 23/3675 |
| | | | | 29/890.032 |
| 2016/0288928 | A1* | 10/2016 | Smith | F28D 15/043 |
| 2018/0031332 | A1* | 2/2018 | Altman | F28F 21/06 |
| 2022/0285762 | A1* | 9/2022 | Ziegler | B64D 27/24 |
| 2022/0315822 | A1* | 10/2022 | Palomo Del Barrio | |
| | | | | B01J 13/04 |
| 2023/0331405 | A1* | 10/2023 | Pamula | B64C 39/024 |

OTHER PUBLICATIONS

Schelden, B. G., and J. O. Golden. "Development of a phase change thermal control device." Journal of Spacecraft and Rockets 10.2 (1973): 99-100. (Year: 1973).*

"Phase Change Material (PCM) Selection", Advanced Cooling Technologies, [Online]. Retrieved from the Internet: <URL: https://www.1-act.com/products/pom-heat--sinks/pcmselection/>, (Accessed Aug. 4, 2021), 8 pgs.

"Phase-change material", Wikipedia, (Accessed Aug. 4, 2021), 26 pgs.

Anderson, William, et al., "TFAWS Passive Thermal Paper Session", Thermal & Fluids Analysis Workshop TFAWS, (2016), 29 pgs.

Mallow, Anne, "Stable Paraffin Composites for Latent Heat Thermal Storage Systems (Thesis)", Georgia Institute of Technology, (2015), 120 pgs.

Pinto, Aditya, "Development of Paraffin Wax as a Phase Change Material for Thermal Management in Electronic Systems (Thesis)", The University of Texas at Arlington, (2016), 45 pgs.

* cited by examiner

44

| PCM | MELTING POINT, TM |
|---|---|
| POLYETHYLENE GLYCOL 600[47] | 20°C(68°F) |
| COCONUT OIL (HEPTADECANE (17 CARBON PARAFFIN WAX)) | 25°C(78°F) |
| P-LATTIC ACID[47] | 26°C(79°F) |
| PARAFFIN 18-CARBONS[47] | 28°C(82°F) |
| METHYL PALMITATE[47] | 29°C(84°F) |
| TME(63%)/ H2O(37%)# | 29.8°C(85.6°F) |
| LiNO3.3H2O | 30.15°C(86.27°F) |
| PARAFFIN 19-CARBONS[47] | 32°C(90°F) |
| SODIUM SULFATE (NA2SO4-10H2O) | 32.4°C(90.3°F) |
| TRIMYRISTIN[47] | 33°C(91°F) |
| CAPRIC ACID[47] | 36°C(97°F) |
| PARAFFIN 20-CARBONS[47] | 36.7°C(98.1°F) |
| CAMPHENILONE[47] | 39°C(102°F) |
| CAPRYLONE[47] | 40°C(104°F) |
| DOCASYL BROMIDE[47] | 40°C(104°F) |
| PARAFFIN 21-CARBONS[47] | 40.2°C(104.4°F) |
| 1-CYCLOHEXYLOOCTADECANE[47] | 41°C(106°F) |
| 4-HEPTADACANONE[47] | 41°C(106°F) |
| HEPTADECANONE[47] | 41°C(106°F) |
| PHENOL[47] | 41°C(106°F) |
| P-JOLUIDINE[47] | 43.3°C(109.9°F) |
| CYANAMIDE[47] | 44°C(111°F) |
| PARAFFIN 22-CARBONS[47] | 44°C(111°F) |
| LAURIC ACID | 44.2°C(111.6°F) |
| METHYL EICOSANATE[47] | 45°C(113°F) |

Fig.4

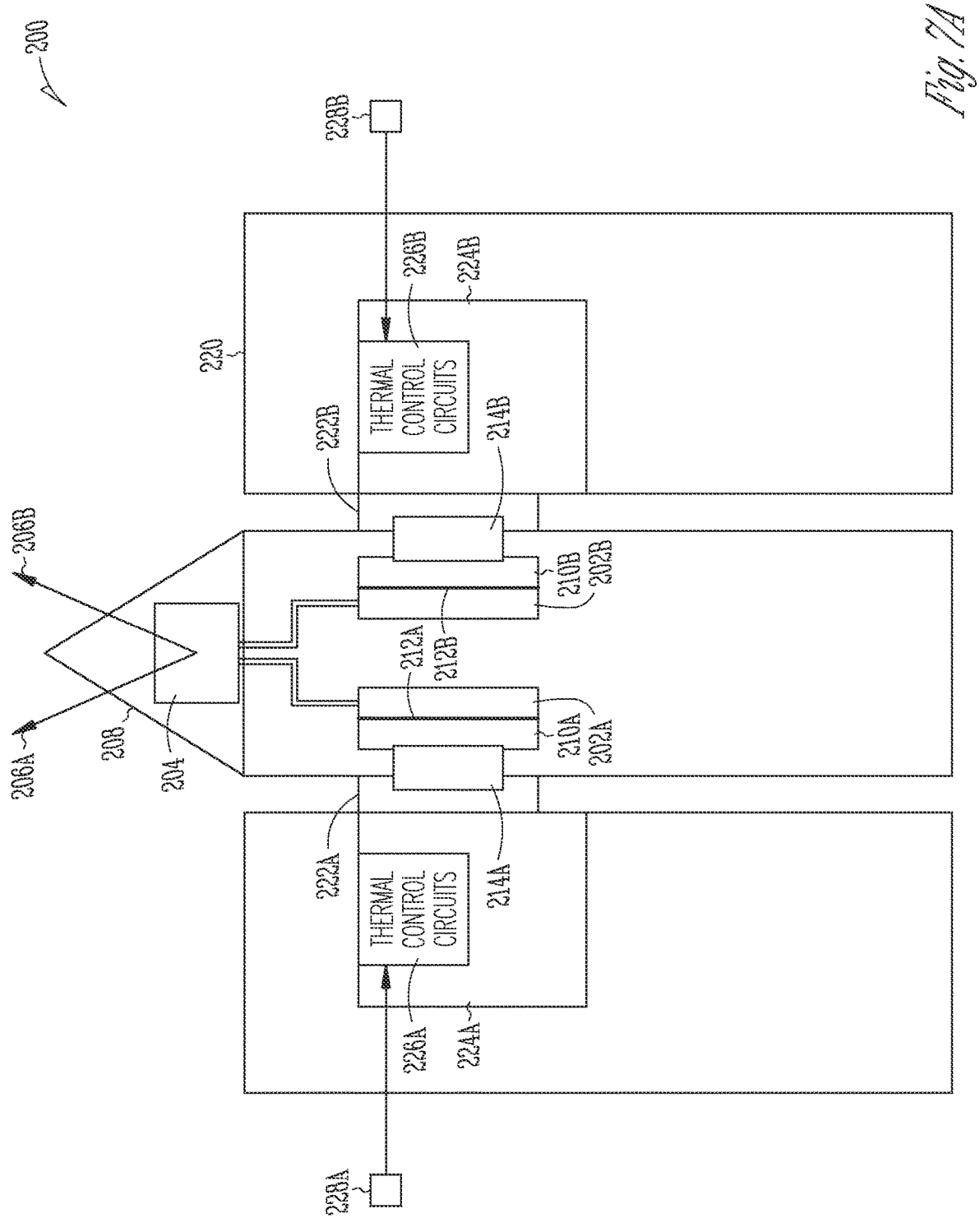

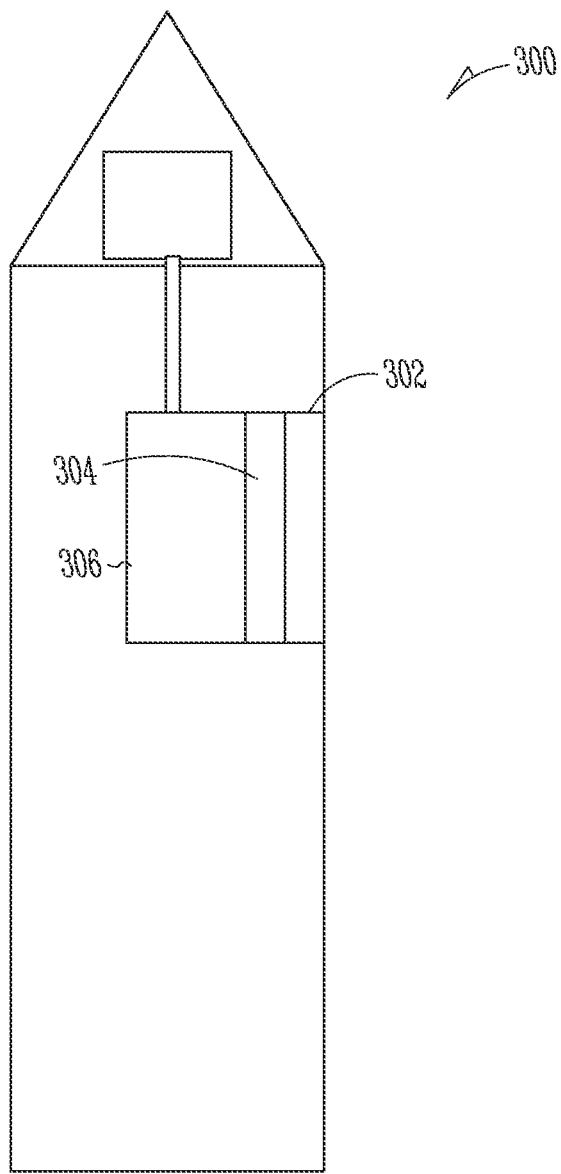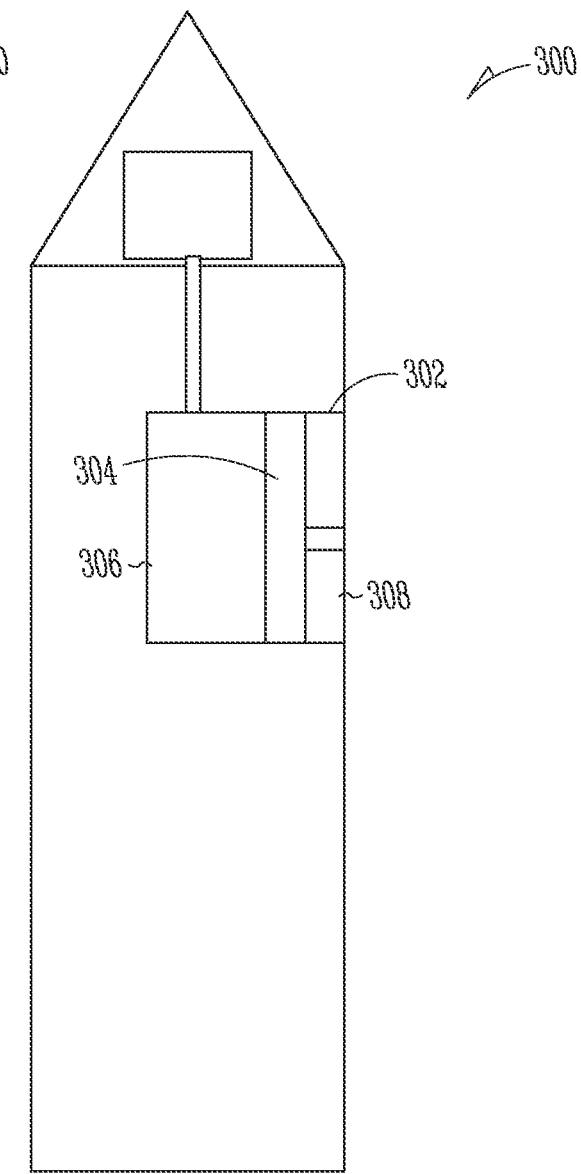
*Fig. 8A*   *Fig. 8B*

ND METHOD FOR THERMAL
CONTROL OF POWERED SYSTEMS
ON-BOARD A FLIGHT VEHICLE USING
PHASE CHANGE MATERIALS (PCMS)

GOVERNMENT LICENSE RIGHTS

This invention was made with government support under N00014-19-C-1058 awarded by the United States Navy. The government has certain rights in this invention.

BACKGROUND OF THE INVENTION

Field of the Invention

This invention relates to thermal control of powered systems on-board a flight vehicle having limited packaging volume.

Description of the Related Art

Flight vehicles such as missiles, rockets, guided projectiles, drones and other platforms have limited packaging volume to accommodate many flight systems including propulsion, control actuation, guidance, communications, sensors and active illumination. The sensors and active illumination may span optical (ultra-violet UV, infrared IR, visible), radio frequency RF or microwave bands. In flight, the temperature of these systems or components thereof may increase due to aero heating of the vehicle or waste heat generated by those systems/components or other systems/components in the confined packaging volume. Certain components such as lasers, microwave emitters, RF sensors, or high density power electronics generate significant amounts of waste heat and must maintain a desired operating temperature to avoid performance degradation or damage to the component.

Heat must be taken away from these high-power components to maintain the desired operating temperature. A thermal interface (TIN) is engineered to conduct excess heat away from the high-power components. In certain applications the TIN conducts the excess heat to the surface of the flight vehicle where it is dumped into the atmosphere. If aero heating heats the surface of the flight vehicle, the TIN can be engineered to conduct the excess heat to a mass (e.g. a block of Aluminum) positioned away from the critical component to store the heat within the packaging volume. The limited packaging volume of these flight vehicles does not allow for active cooling systems such as a large-scale thermo-electric cooler (TEC), heating, ventilation and air conditioning (HVAC) chiller or chilled liquid loop of sufficient capacity to remove the excess heat and maintain the desired operating temperature for the critical powered system.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides a system and method for thermal control of powered systems on-board a flight vehicle using Phase Change Materials (PCMs). This approach leverages the large latent heat storage capacity of PCMs to maintain the operating temperature at or slightly above the melting temperature of the PCM. The invention is particularly well suited for use with powered systems such as laser, microwave emitters, RF sensors and high-density power electronics that must operate at a desired operating temperature while generating considerable waste heat in a confined packaging volume of smaller flight vehicles such as missiles, rockets, guided projectiles, drones or other such platforms.

A reservoir containing a phase change material (PCM) is placed in direct thermal contact, possibly through a TIN, with the powered system. The PCM has a melting point temperature between 20° C. and 45° C. and less than the desired operating temperature. The reservoir is preferably isolated to minimize the transfer of waste heat from other sources to the reservoir. Prior to launching the flight vehicle, the temperature of the reservoir and PCM is lowered to below its melting point to ensure that the PCM is in a solid phase. During flight, the powered system is activated thereby generating waste heat that is transferred to the reservoir to initiate a phase change of the solid PCM to a liquid state at the melting point temperature thereby maintaining the temperature of the powered device at the desired operating temperature of the course of the mission.

In an embodiment, the flight vehicle is launched from a launch platform. The launch platform includes a cold plate that is thermally coupled to the reservoir and a cooling source configured to extract heat from the cold plate to lower the temperature of the cold plate to solidify the PCM pre-launch. An outer surface of the reservoir opposite the powered system may provide (or be conformal with) an outer surface (or be conformal with) of the fight vehicle for direct coupling to the cold plate. Alternately, the reservoir may be displaced from the surface of the flight vehicle with a conductive tab providing a thermally conductive path from the reservoir to the cold plate. If the ambient temperature is sufficiently lower than the melting point temperature the PCM may be assumed to be in the solid phase and direct cooling withheld.

In an embodiment in which the only way to actively cool the reservoir and PCM is via the launch platform, the mass of the PCM is selected to have a latent heat storage capacity in excess of a heat sinking requirement to accomplish a mission for the flight vehicle.

In an alternate embodiment, a TEC is placed in direct thermal contact with the reservoir opposite the powered system. In this case, the mass of the PCM is selected to have insufficient latent heat storage to accomplish the mission. During flight, the TEC is activated to remove heat from the reservoir to slow the phase change of the PCM from solid to liquid to effectively increase the latent heat storage capacity of the PCM to greater than the heat sinking requirement. If provided with a TEC, the pre-launch solidifying of the PCM can be accomplished either with the TEC or by the cooling system and cold plat that is part of the launch platform.

These and other features and advantages of the invention will be apparent to those skilled in the art from the following detailed description of preferred embodiments, taken together with the accompanying drawings, in which:

BRIEF DESCRIPTION OF THE DRAWINGS

FIG. 4 is a Table of a number of PCMs having melting point temperatures between 20° C. and 45° C.;

FIGS. 7A and 7B are a side view of a flight vehicle and launch platform configured to support a pair of PCM reservoirs and a top view of the flight vehicle; and FIGS. 8A and 8B are simplified diagrams of different configurations of a flight vehicle including a PCM reservoir and a TEC configured to remove heat from the PCM during flight.

DETAILED DESCRIPTION OF THE INVENTION

Figure 1:
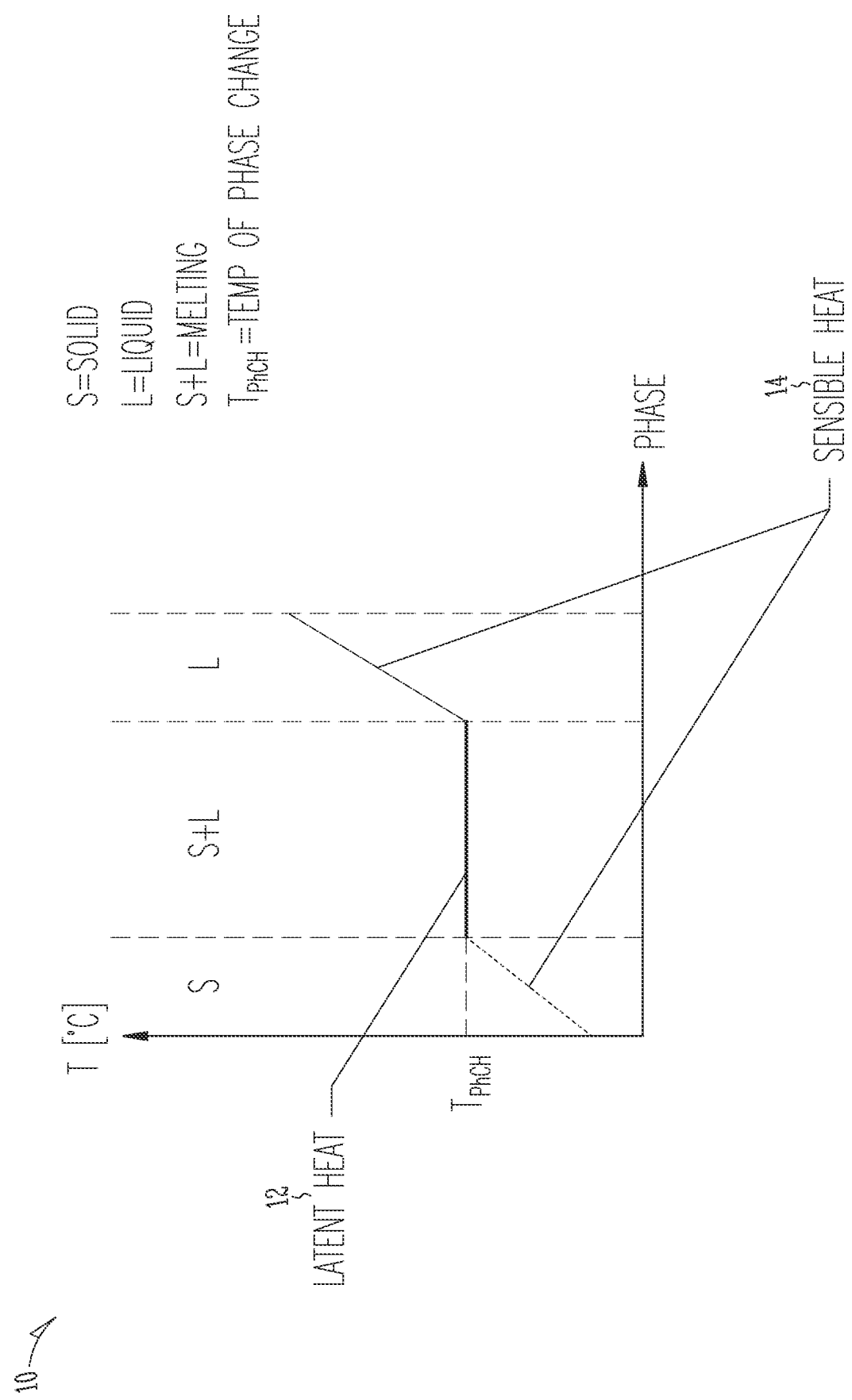
FIG. 1 is a PCM phase diagram.

There are two primary methods of storing thermal energy, sensible heat and latent heat. Sensible heat is the heat stored in a substance by raising the temperature of the solid or liquid. Latent heat is the thermal energy associated with the phase change of a material, measured as a latent heat of fusion (freezing/melting, [kJkg$^{-1}$]). As shown in FIG. 1 depicting a phase diagram 10, an ideal material absorbs heat at a constant temperature TphCH (temp of phase change) when transitioning from solid (S) to liquid (L), and releases energy at a constant temperature when it is undergoing the opposite change of phase in a latent heat region 12. Sensible heat 14 is stored by raising the temperature of the solid (S) or liquid (L) on either side of the latent heat region and released by lowering the temperature. Latent heat storage systems have the ability to provide much higher energy storage density, while storing heat over a nearly isothermal temperature range corresponding to the phase-transition temperature. Latent heat storage materials, referred to as Phase Change Materials (PCMs), can store and release heat during change in phase from solid-liquid and liquid-solid.

The present invention provides a system and method for thermal control of powered systems on-board a flight vehicle using PCMs. This approach leverages the large latent heat storage capacity of PCMs to maintain the operating temperature at or slightly above the melting temperature of the PCM. The invention is particularly well suited for use with powered systems such as lasers, microwave emitters, RF sensors and high-density power electronics that must operate at a desired operating temperature while generating considerable waste heat in a confined packaging volume of smaller flight vehicles such as missiles, rockets, guided projectiles, drones or other such platforms.

One issue was how to transition and maintain the PCM in its solid phase on-board the flight vehicle until it was needed to store waste heat from the powered system. In the confined packaging volume of the platforms of interest, there is simply not enough space to provide active cooling system of sufficient capability to extract heat from and solidify the PCM under time, power and volume constraints. The solution was to solidify the PCM prior to launching the flight vehicle. This allowed for either the use of a large cooling system such as a chilled liquid loop, HVAC chiller or large-scale TEC to rapidly solidify the PCM or the use of a small-scale TEC on-board the flight vehicle having sufficient time to solidify the PCM. The small-scale TEC on-board the flight vehicle can also be used in flight to effectively increase the heat storage capacity of the PCM. Whether to include a small TEC on-board is a volume and mass design trade-off versus the mass of the PCM and will be application specific.

Figure 2:
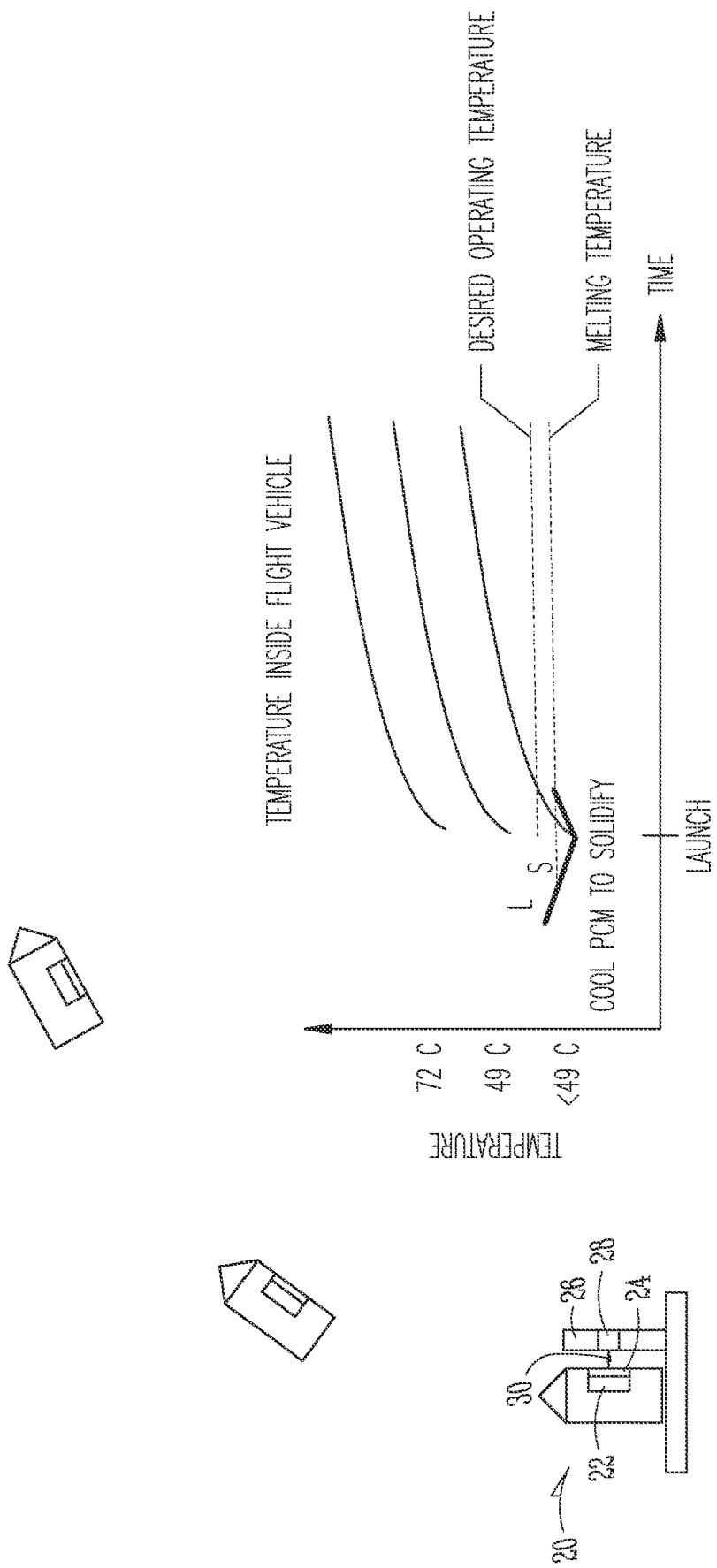
FIGS. 2 and 3 are a diagram and flow diagram illustrating a method for solidifying a reservoir of PCM on-board a flight vehicle prior to launch to maintain the operating temperature of a powered system on the flight vehicle at or slight above the melting point temperature of the PCM during flight.
Figure 3:
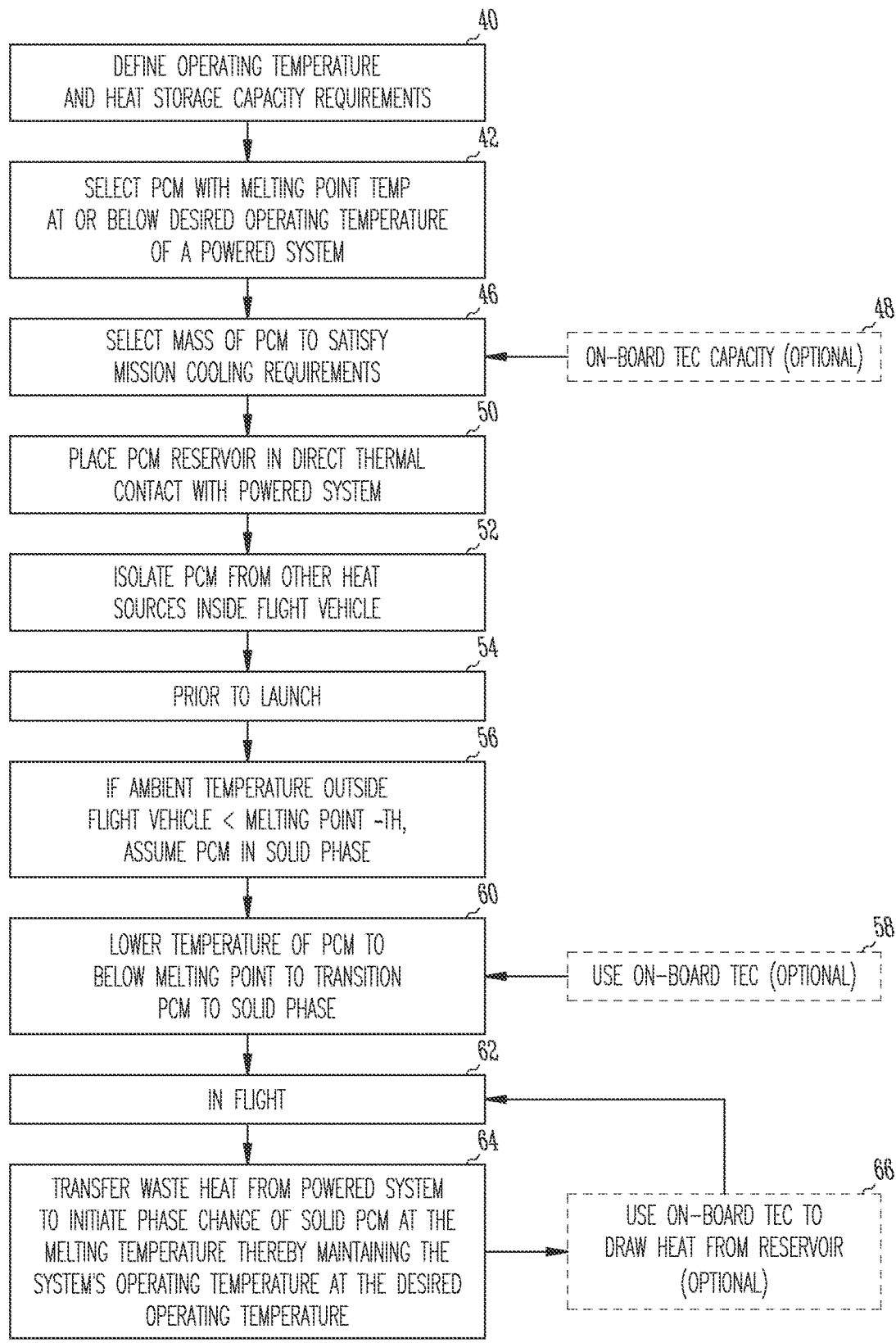

Referring now to FIGS. 2 and 3, in an embodiment a flight vehicle 20 includes a powered system 22 that is designed to operate at a desired operating temperature and when operational generates waste heat a reservoir 24 of a mass of PCM in direct thermal contact with the powered system 22. Flight vehicle 20 is launched from a launch platform 26. Either the launch platform 26 includes a cooling system 28 or the flight vehicle includes a small-scale TEC (not shown) thermally coupled to extract heat 30 from the reservoir 24 to solidify the PCM or both.

A system designer first has to define the desired operating temperature of powered system 22 and the heat storage capacity requirement to absorb waste heat from the powered system to maintain that desired operating temperature (step 40). The system designer selects a particular PCM whose melting temperature (phase change temperature from solid to liquid) is at or somewhat less than the desired operating temperature (step 42). Ideally, there would be no thermal losses between the powered system and reservoir but in any practical system there is a measure of thermal resistance such that the melting temperature will need to be some what less than the operating temperature, typically between approximately 0° C. and 10° C. The systems are typically engineered to make the delta as close to zero as possible. Powered systems of interest such as lasers, microwave emitters, RF sensors and high-density power electronics will require a melting point temperature in a range between 20° C. and 45° C. A representative but not exhaustive list of suitable PCMs 44 with melting temperatures in this range are provided in FIG. 4. The system designer computes the mass of the PCM required to satisfy heat storage capacity requirement (step 46). This will be a function of the specific heat capacity of the chosen PCM and whether or not a small TEC is provided on-board the flight vehicle (step 48). If not, the mass of PCM must satisfy the heat storage capacity (within a tolerance) in a one-shot use configuration. If yes, the mass of PCM is less and not sufficient on its own to satisfy the requirement. The TEC can be used in-flight to extract heat from the reservoir to slow the phase change of the PCM from solid to liquid thereby effectively increasing its heat storage capacity. The waste heat extracted by the TEC is dumped into the atmosphere outside the flight vehicle. The heat capacity of the mass of PCM and the TEC (if available) should be such that the PCM never fully liquefies in flight.

To configure the latent heat storage system, the PCM reservoir 24 is placed in direct thermal contact with the powered system 22 (step 50). A thermal interface (TIN) may be placed between the reservoir 24 and the powered system 22 to minimize thermal resistance. In other cases, a surface of the reservoir 24 is placed in direct mechanical and thermal contact with a surface of the powered system. As part of the overall system design, the reservoir 24 is suitably thermally isolated from other heat sources inside the flight vehicle so that all of its heat storage capacity is available to absorb waste heat from the powered system (step 52). Isolation may be achieved by placing the reservoir 24 as far as possible for other sources of heat or by insulating the reservoir 24. No design is perfect but the goal is to reduce other thermally conductive paths to the reservoir as much as possible.

Prior to launch (step 54), the automated systems on the launch platform 26 or flight vehicle 20 must ensure that the reservoir of PCM is fully solidified. If a measured ambient temperature outside the flight vehicle is sufficiently below the melting point (e.g. ambient temp<melting point temp−threshold), the system can assume with confidence that the PCM is in its solid phase (step 56). If not, the system employs either the launcher's cooling system 28 or the vehicle's TEC 58 (if one is provided) to lower the temperature of the reservoir and PCM to below the melting point to transition the PCM from a liquid to a solid phase (step 60). Even if the vehicle is provided with a TEC, it may be preferable to use the launcher's larger, hence faster, cooling system to solidify the PCM.

In flight (step 62), waste heat is transferred from the powered system 22 into the reservoir 24 to initiate a phase change of the solid PCM at the melting temperature thereby maintaining the powered system's operating temperature at the desired operating temperature (step 64). As the mission progresses and more waste heat is stored in the reservoir the percentage of the PCM that is liquefied continues to increase but (per design) will never fully liquefy, and thus the reservoir will remain at the melting temperature. If the small on-board TEC is provided, it can draw heat from the reservoir to slow the liquefaction of the PCM thereby effectively increasing the heat storage capacity of the reservoir (step 66). The heat drawn from the TEC is transferred to the surface of the flight vehicle and dumped into the atmosphere.

As shown in FIG. 2, the temperature inside the flight vehicle at launch is dictated by the ambient air temperature around the launch platform. This can range from 49° C. (1% Hot Mil Std) up to 72° C. (1% Hot Mil Std plus Solar heating) and down to <<49° C. in very cold parts of the world. The system must be designed to handle the worst-case high temperatures. The temperature inside the flight vehicle after launch can increase due to aero heating or waste heat generated by various powered systems. To maintain the powered system's desired operating temperature under worst-case temperatures, the system must be cooled with considerable heat storage capacity. Furthermore, the reservoir of PCM material must be actively cooled (or the temperature measured) to ensure that the PCM material is in a solid phase at launch.

Figure 5:
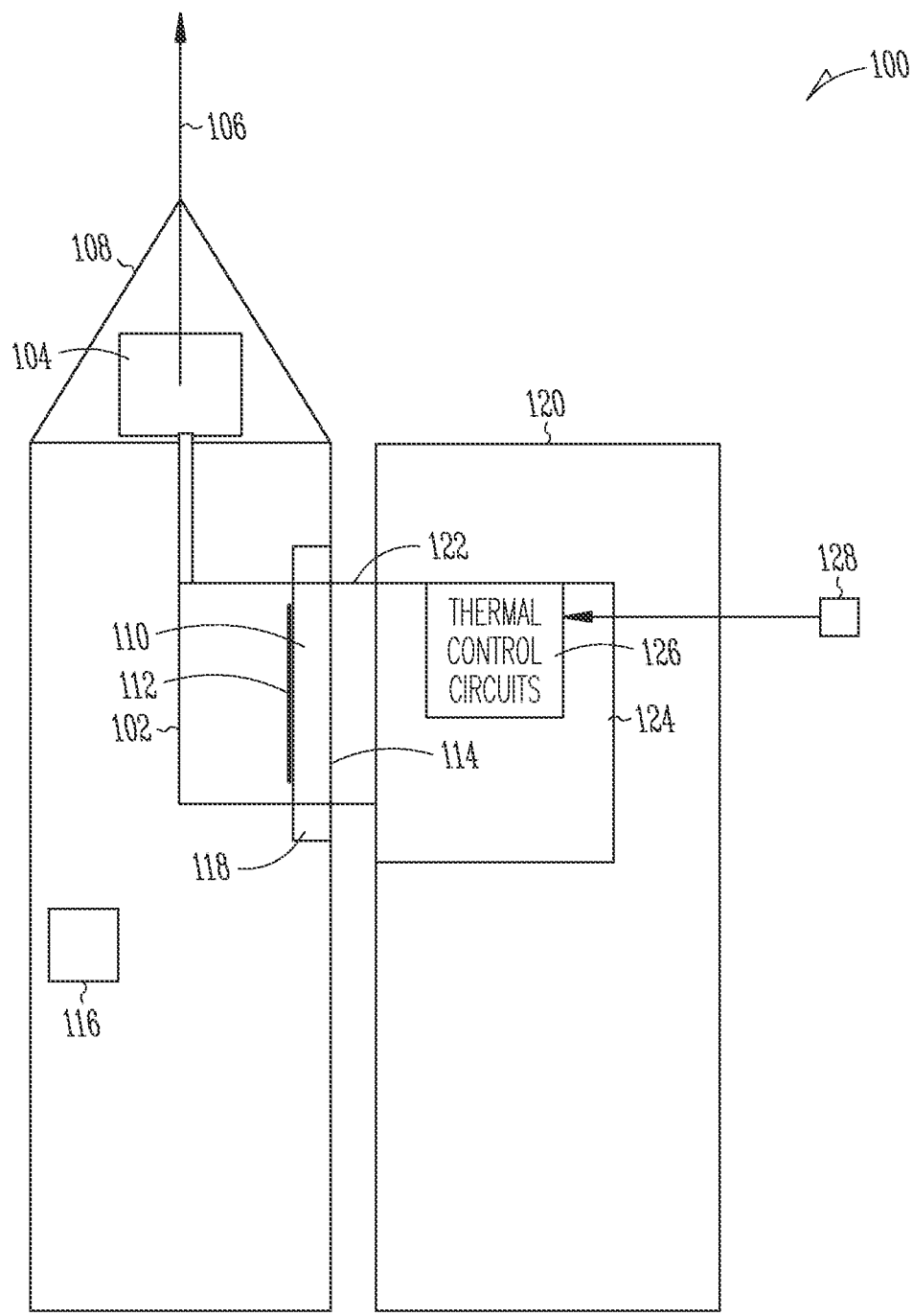
FIG. 5 is a simplified diagram of a flight vehicle including a PCM reservoir and a launch platform configured to solidify the PCM reservoir pre-launch.

Referring now to FIG. 5, in an embodiment a flight vehicle 100 includes a laser 102 that is optically coupled to an emitter 104 to emit a laser beam 106 through an optically transparent window/dome 108. A reservoir 110 of PCM is placed in direct thermal contact with laser 102 through a TIN 112. In this particular configuration, an outer surface 114 of the reservoir 110 opposite the laser 102 provides, or is conformal with, an outer surface of the flight vehicle. The reservoir 110 is thermally isolated from other sources 116 of heat (internal or external) by placement of the laser and reservoir with respect to such sources or by placement of insulation 118 around the reservoir.

A launch platform 120 includes a cold plate 122 that is thermally coupled to the reservoir 110 as, or conformal with, the outer surface of the flight vehicle pre-launch and a cooling source 124 (e.g. a large-scale thermo-electric cooler (TEC), HVAC chiller or chilled liquid loop) configured to extract heat from the cold plate 122 to lower the temperature of the cold plate to solidify the PCM pre-launch. Thermal control circuits 126 use a temperature-measuring device 128 such as a thermo-couple to measure the ambient air temperature and to decide whether active cooling is required to solidify the PCM. If the ambient temperature is sufficiently lower than the melting temperature than the PCM is safely solidified.

Figure 6B:
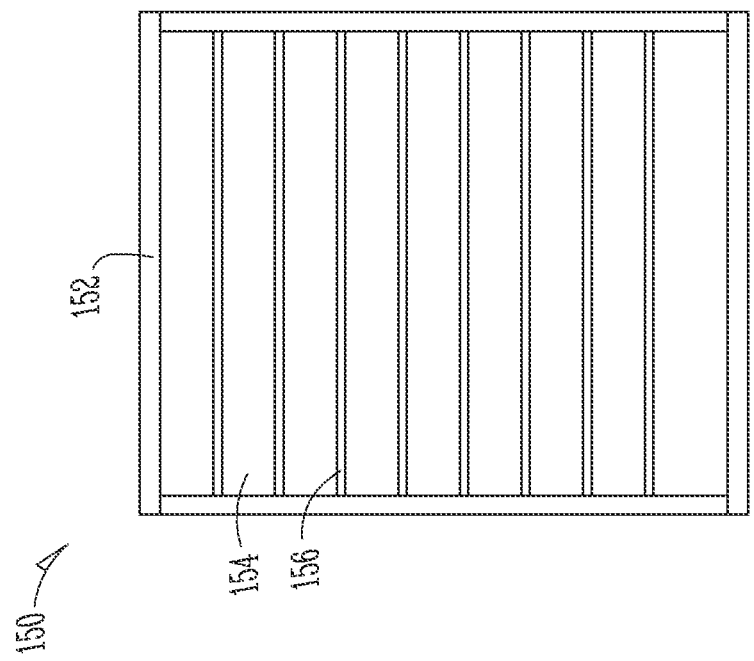
FIGS. 6A and 6B are side and top views of an embodiment of a PCM reservoir.
Figure 6A:
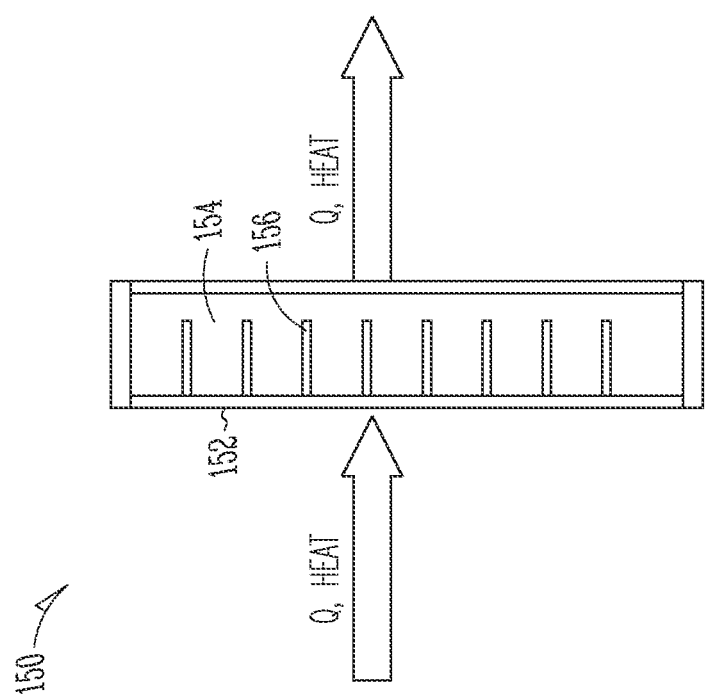

Referring now to FIGS. 6A and 6B, an embodiment of a PCM reservoir 150 suitably includes a vessel 152 formed of a highly thermally conductive material such as Aluminum that is filled with PCM 154. To maximize the surface areas of an inner surface 156 that is in direct thermal contact with the powered system and an outer surface 158 that is either coupled to the launch platform's cooling plate, the on-board TEC or both for a given mass of PCM, the depth of vessel 152 from front-to-back is fairly small such that the vessel is fairly flat. The vessel is suitably provided with a conduction matrix 160 (e.g. aluminum plates) to more uniformly store or remove heat from the reservoir. This depiction is merely representative of an embodiment of a PCM reservoir, various other shapes, sizes and configurations would be appropriate depending on the nature of the powered system and the packaging constraints of the flight vehicle.

Figure 7B:
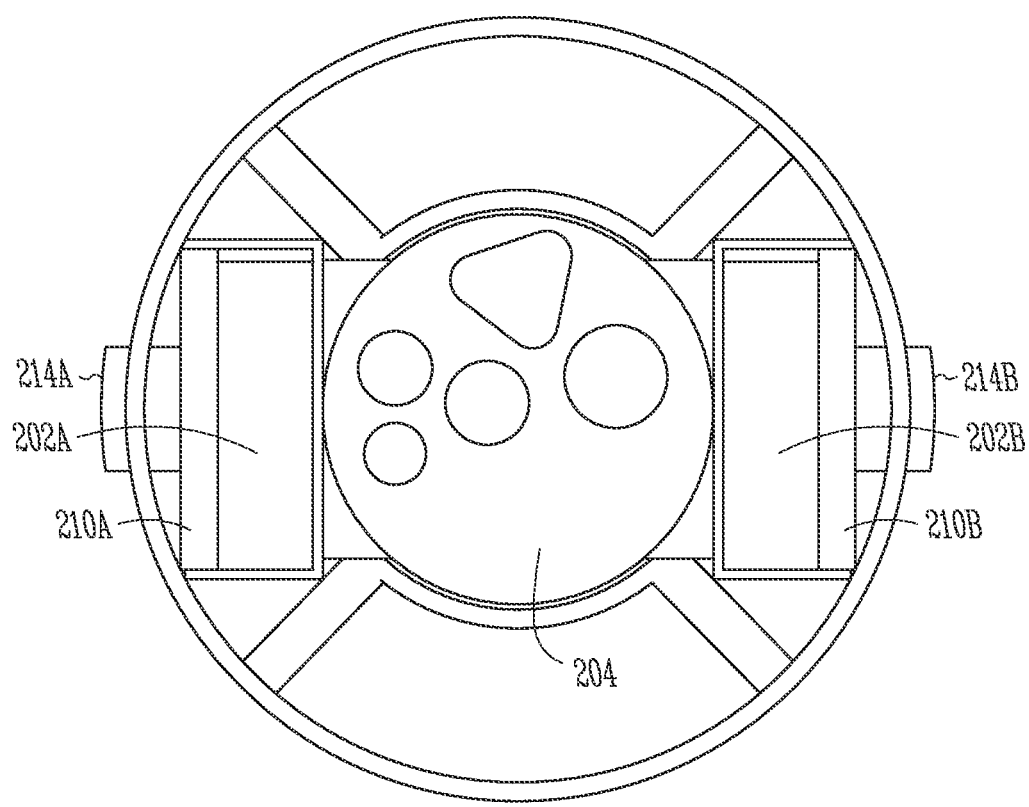

Referring now to FIGS. 7A and 7B, in an embodiment a flight vehicle 200 includes a pair of lasers 202a and 202b that are optically coupled to an emitter 204 to emit laser beams 206a and 206b through an optically transparent window/dome 208. Reservoirs 210a and 210b of PCM are placed in direct thermal contact with lasers 202a and 202b through TIN 212a and 212b, respectively. Depending upon the desired operating temperatures of the lasers, the PCM may be the same or different material to have equal disparate melting temperatures. In this particular configuration, the reservoirs are rectangular shaped with flat opposing inner and outer surfaces. Conduction tabs 214a and 214b (suitably Aluminum or another material with high thermal conductivity) are in direct thermal contact with the outer surfaces of reservoirs 210a and 210b and extend to the surface of the flight vehicle. The reservoirs 210a and 210b are thermally isolated from other sources of heat (internal or external) by placement of the laser and reservoir with respect to such sources or by placement of insulation around the reservoir.

A launch platform 220 includes cold plates 222a and 222b that are thermally coupled to reservoirs 210a and 210b via conduction tabs 214a and 214b and cooling sources 224a and 224b (e.g. a large-scale thermo-electric cooler (TEC), HVAC chiller or chilled liquid loop) configured to extract heat from the cold plates 222a and 222b to lower the temperature of the cold plate to solidify the PCM pre-launch. Thermal control circuits 226a and 226b use temperature measuring devices 228a and 228b such as a thermo-couple to measure the ambient air temperature and decide whether active cooling is required to solidify the PCM. If the ambient temperature is sufficiently lower than the melting temperature than the PCM is safely solidified.

Referring now to FIGS. 8A and 8B, different embodiments of a flight vehicle 300 are provided with a small on-board TEC 302 that is in direct thermal contact with the backside of a PCM reservoir 304 that is in direct thermal contact with a powered system 306.

As shown in FIG. 8A, TEC 302 is configured to cover the entire backside surface area of the PCM reservoir 304 to maximize its ability to draw heat from the reservoir. Pre-launch, TEC 302 may be activated to draw heat from the reservoir to solidify the PCM and dump that heat directly into the atmosphere. Alternately, the launch platform's larger cooling system can be coupled to the backside of TEC 302 as if it were a cold plate to draw heat out of the TEC to improve its efficiency. In flight, TEC 302 draws heat from the PCM reservoir to slow the liquefaction of the PCM to effectively increase the heat storage capacity of the reservoir. The heat drawn from the PCM reservoir is coupled through the skin and dumped to the atmosphere.

As shown in FIG. 8B, TEC 302 is configured to cover only a portion of the backside surface area of the PCM reservoir 304, which limits its ability to draw heat from the reservoir. However, this allows a conduction tab 308 to make direct thermal contact to PCM reservoir 304. Pre-launch, the launch platform's larger cooling system can be directly coupled to the conduction tab 308 to draw heat from the PCM reservoir and solidify the PCM. In flight, the TEC 302 draws heat albeit less efficiently from the PCM reservoir to slow the liquefaction process.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A method of, maintaining a desired operating temperature for a powered system on-board a flight vehicle, the method comprising:
   placing a reservoir containing a phase change material (PCM) in direct thermal contact with the powered system on-board the flight vehicle, said PCM having a melting point temperature at or less than the desired operating temperature and said melting point temperature lying between 20° C. and 45° C.;
   prior to launching the flight vehicle,
      mounting the flight vehicle on a launch platform,
      thermocoupling a cold plate to the reservoir, and
      using a cooling source to extract heat from the cold plate to lower the temperature of the cold plate to lower the temperature of the PCM to below its melting point to solidify the PCM pre-launch, and
   during flight, activating the powered system thereby generating waste heat that is transferred to the reservoir to initiate a phase change of the solid PCM to a liquid state at the melting point temperature thereby maintaining the temperature of the powered device at the desired operating temperature.

2. The method of claim 1, wherein the powered system is a laser.

3. The method of claim 1, wherein the reservoir is placed in direct thermal contact with the powered system through a thermal interface (TIN).

4. The method of claim 1, wherein the melting point temperature is between 0° C. and 10° C. of the desired operating temperature.

5. The method of claim 1, further comprising:
   thermally isolating the reservoir of PCM to minimize the transfer of waste heat from other sources to the reservoir.

6. The method of claim 1, wherein the flight vehicle has a heat sinking requirement for the powered system, further comprising:
   selecting the mass of said PCM to have a latent heat storage capacity in excess of the heat sinking requirement for the flight vehicle.

7. The method of claim 1, wherein prior to launch, further comprising:
   measuring an ambient temperature outside the flight vehicle;
   if the ambient temperature is less than the melting point temperature minus a threshold temperature, determining that the PCM is in the solid phase.

8. The method of claim 1, wherein an outer surface of the reservoir opposite the powered system provides, or is conformal with, an outer surface of the flight vehicle for coupling to the cold plate.

9. The method of claim 1, wherein the reservoir is displaced from a surface of the flight vehicle, further comprising:
   providing a thermally conductive tab that provides a thermally conductive path from the reservoir to the surface of the flight vehicle for coupling to the cold plate.

10. A method of maintaining a desired operating temperature for a powered system on-board a flight vehicle, the method comprising:
    selecting a mass of a phase change material (PCM) to have a latent heat storage capacity less than a heat sinking requirement for the powered system on-board the flight vehicle;
    placing a reservoir containing the selected mass of PCM in direct thermal contact with the powered system on-board the flight vehicle, said PCM having a melting point temperature at or less than the desired operating temperature and said melting point temperature lying between 20° C. and 45° C.;
    placing a thermo-electric cooler (TEC) in direct thermal contact with the reservoir opposite the powered system;
    prior to launching the flight vehicle lowering the temperature of the reservoir and PCM to below its melting point to ensure that the PCM is in a solid phase; and
    during flight, activating the powered system thereby generating waste heat that is transferred to the reservoir to initiate a phase change of the solid PCM to a liquid state at the melting point temperature and activating the TEC to remove heat from the reservoir to slow the phase change of the PCM from solid to liquid to effectively increase the latent heat storage capacity of the PCM to greater than the heat sinking requirement thereby maintaining the temperature of the powered device at the desired operating temperature.

11. The method of claim 10, wherein prior to launch, using the TEC to lower the temperature of the reservoir and PCM to below the melting point to ensure that the PCM is in a solid phase.

12. The method of claim 10, wherein prior to launch, further comprising:
    mounting the flight vehicle on a launch platform;
    thermally coupling a cold plate to the reservoir or backside of the TEC pre-launch; and
    using a cooling source to extract heat from the cold plate to lower the temperature of the cold plate to solidify the PCM pre-launch.

13. The method of claim 10, wherein the reservoir is placed in direct thermal contact with the powered system through a thermal interface (TIN).

14. The method of claim 10, wherein the melting point temperature is between 0° C. and 10° C. of the desired operating temperature.

15. The method of claim 10, further comprising:
    thermally isolating the reservoir of PCM to minimize the transfer of waste heat from other sources to the reservoir.

* * * * *

UNITED STATES PATENT AND TRADEMARK OFFICE
CERTIFICATE OF CORRECTION

| | | |
|---|---|---|
| PATENT NO. | : 12,227,312 B2 | Page 1 of 1 |
| APPLICATION NO. | : 17/478440 | |
| DATED | : February 18, 2025 | |
| INVENTOR(S) | : Holt et al. | |

It is certified that error appears in the above-identified patent and that said Letters Patent is hereby corrected as shown below:

In the Claims

In Column 7, Line 25, in Claim 1, after "vehicle,", delete a linebreak

In Column 8, Line 27, in Claim 10, delete "vehicle" and insert --vehicle,-- therefor Signed and Sealed this
Thirtieth Day of December, 2025

John A. Squires
*Director of the United States Patent and Trademark Office*